(12) United States Patent
Li et al.

(10) Patent No.: US 11,821,501 B2
(45) Date of Patent: Nov. 21, 2023

(54) SYSTEM FOR A POWER TAKE OFF MECHANISM FOR A POWERTRAIN SYSTEM

(71) Applicant: GM GLOBAL TECHNOLOGY OPERATIONS LLC, Detroit, MI (US)

(72) Inventors: Dongxu Li, Troy, MI (US); Chengwu Duan, Shanghai (CN); Norman K. Bucknor, Troy, MI (US); Chunhao J. Lee, Troy, MI (US); Lei Hao, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/562,145

(22) Filed: Dec. 27, 2021

(65) Prior Publication Data
US 2023/0167888 A1     Jun. 1, 2023

(30) Foreign Application Priority Data

Nov. 30, 2021   (CN) .......................... 202111441094.2

(51) Int. Cl.
| | |
|---|---|
| *F16H 45/02* | (2006.01) |
| *B60K 17/28* | (2006.01) |
| *B60K 17/10* | (2006.01) |
| *B60K 17/08* | (2006.01) |
| *F16D 21/00* | (2006.01) |
| *B60K 1/00* | (2006.01) |
| *F16H 45/00* | (2006.01) |

(52) U.S. Cl.
CPC ............... *F16H 45/02* (2013.01); *B60K 1/00* (2013.01); *B60K 17/08* (2013.01); *B60K 17/10* (2013.01); *B60K 17/28* (2013.01); *F16D 21/00* (2013.01); *F16H 2045/002* (2013.01); *F16H 2045/005* (2013.01)

(58) Field of Classification Search
CPC ........... B60K 1/00; B60K 17/08; B60K 17/28
See application file for complete search history.

(56) References Cited

U.S. PATENT DOCUMENTS

| | | | |
|---|---|---|---|
| 8,545,355 B2 | 10/2013 | Frait | |
| 9,912,203 B2 | 3/2018 | Lucchi | |
| 10,202,031 B2 * | 2/2019 | Lo | ........................... B60K 17/28 |
| 10,746,271 B2 * | 8/2020 | Hwang | ................... F16H 37/04 |
| 10,753,432 B2 * | 8/2020 | Hwang | ................... B60K 6/48 |
| 11,485,217 B2 | 11/2022 | Matsuoka | |

(Continued)

FOREIGN PATENT DOCUMENTS

| | | | |
|---|---|---|---|
| DE | 10254701 A1 | 7/2003 | |
| DE | 102019219048 A1 | 6/2021 | |
| SE | 544040 C2 * | 11/2021 | ............... B60K 1/00 |

*Primary Examiner* — Drew J Brown
*Assistant Examiner* — Matthew Joseph Ganci
(74) *Attorney, Agent, or Firm* — Quinn IP Law (57) ABSTRACT

A system for a power take-off mechanism for a powertrain system is provided. The system includes an electrically powered torque generating device including a torque generating device output shaft and a transmission output shaft receiving mechanical power from the torque generating device output shaft. The system further includes a clutch selectively disengaging the transmission output shaft from the torque generating device output shaft and a power take-off module receiving mechanical power from the torque generating device.

15 Claims, 7 Drawing Sheets

(56) References Cited

U.S. PATENT DOCUMENTS

| | | |
|---|---|---|
| 2018/0034352 A1 | 2/2018 | Boettcher |
| 2019/0176618 A1* | 6/2019 | Bassis .................... B60K 1/02 |
| 2021/0212085 A1 | 7/2021 | Wu |
| 2021/0254686 A1* | 8/2021 | Engerman ............... F16H 48/06 |

* cited by examiner

SYSTEM FOR A POWER TAKE OFF MECHANISM FOR A POWERTRAIN SYSTEM

CROSS REFERENCE TO RELATED APPLICATIONS

This disclosure claims priority to China Patent Application 202111441094.2 filed on Nov. 30, 2021 which is hereby incorporated by reference.

INTRODUCTION

The disclosure generally relates to a system for a power take-off mechanism for a powertrain system.

Electrical motors are employed in vehicles as primary sources of motive power for the vehicle, e.g., in battery electric vehicles (BEVs), or as complements to other power sources such as internal combustion engines, e.g., in hybrid vehicles. Electric motor-generator units (MGUs) typically provide a relatively high torque output at low motor speeds in comparison to internal combustion engines of comparable power outputs, and as such MGUs are useful for providing "low-end" power for a vehicle. Nevertheless, MGUs are typically a relatively expensive and heavy component of a vehicle powertrain, especially where greater torque and/or power output is desired.

A vehicle may include a goal to provide a secondary output torque, for example, to provide mechanical power to an auxiliary device. Examples of such devices may include a refuse compactor, a hook-loader crane device, a vacuum truck accessory, a hydraulic pump, a winch device, and a blower device.

SUMMARY

A second, dedicated electric machine may be used to provide a secondary output torque for use by an auxiliary device. However, such a second, dedicated electric machine adds weight and inefficiency to the vehicle.

A system for a power take-off mechanism for a powertrain system is provided. The system includes an electrically powered torque generating device including a torque generating device output shaft and a transmission output shaft receiving mechanical power from the torque generating device output shaft. The system further includes a clutch selectively disengaging the transmission output shaft from the torque generating device output shaft and a power take-off module receiving mechanical power from the torque generating device.

In some embodiments, the system further includes an input gear, wherein the power take-off module is connected to the torque generating device output shaft via the input gear.

In some embodiments, the system further includes a chain drive, wherein the power take-off module is connected to the torque generating device output shaft via the chain drive.

In some embodiments, the system further includes a torque converter disposed between the torque generating device output shaft and the transmission output shaft and operable to transmit torque from the torque generating device output shaft and the transmission output shaft, wherein the torque converter includes a torque converter output shaft.

In some embodiments, the system further includes a torque converter bypass shaft and a torque converter clutch selectively connecting the torque converter bypass shaft to the torque generating device output shaft.

In some embodiments, the system further includes a disconnect clutch disposed between the torque generating device output shaft and the torque converter and operable to selectively disconnect the torque converter from the torque generating device output shaft.

In some embodiments, the power take-off module is connected to the torque generating device output shaft between the torque generating device and the disconnect clutch.

In some embodiments, the torque converter includes a rotatable outer housing configured to rotate about a rotating axis of the torque converter device and an impeller configured to rotate about the rotating axis. The torque converter further includes a turbine configured to rotate about the rotating axis and a one-way clutch permitting torque transmission between the turbine and the transmission output shaft. The power take-off module is connected to and receives mechanical power from the rotatable outer housing.

In some embodiments, the power take-off module includes a first power take-off module. The system further includes a second power take-off module.

In some embodiments, the power take-off module includes a power take-off clutch operable to enable selective disengagement of a power take-off shaft from the torque generating device.

In some embodiments, the system further includes a single speed gear reduction portion connected to the torque generating device output shaft.

In some embodiments, the system further includes a gear set connected to the torque generating device output shaft and providing a multiple speed gear ratio between the torque generating device output shaft and the transmission output shaft.

In some embodiments, the power take-off module includes a fixed gear ratio to the torque generating device output shaft. The gear set provides a multiple speed gear ratio between the power take-off module and the transmission output shaft.

According to one alternative embodiment, a system for a power take-off mechanism for a powertrain system is provided. The system includes an electrically powered torque generating device including a torque generating device output shaft and a transmission output shaft receiving mechanical power from the torque generating device output shaft. The system further includes a clutch selectively disengaging the transmission output shaft from the torque generating device output shaft and a torque converter disposed between the torque generating device output shaft and the transmission output shaft. The torque converter is operable to transmit torque from the torque generating device output shaft and the transmission output shaft. The torque converter includes a rotatable outer housing configured to rotate about a rotating axis of the torque converter device and an impeller configured to rotate about the rotating axis. The torque converter further includes a turbine configured to rotate about the rotating axis, a selectable one-way clutch (SOWC) selectively permitting torque transmission between the turbine and the transmission output shaft, and a power take-off module connected to and receiving mechanical power from the rotatable outer housing.

In some embodiments, the power take-off module includes a first power take-off module. The system further includes a second power take-off module receiving mechanical power from the torque generating device.

In some embodiments, the system further includes an input gear, wherein the power take-off module is connected to the rotatable outer housing via the input gear.

In some embodiments, the system further includes a chain drive, wherein the power take-off module is connected to the rotatable outer housing via the chain drive.

According to one alternative embodiment, a system for a power take-off mechanism for a powertrain system is provided. The system includes an electrically powered torque generating device including a torque generating device output shaft and a transmission output shaft receiving mechanical power from the torque generating device output shaft. The system further includes a power take-off module receiving mechanical power from the torque generating device and a planetary gear set connected to the torque generating device output shaft and providing a multiple speed gear ratio between the torque generating device output shaft and the transmission output shaft. The planetary gear set includes at least one clutch selectively disengaging the transmission output shaft from the torque generating device output shaft. The power take-off module includes a fixed gear ratio to the torque generating device output shaft. The planetary gear set provides a multiple speed gear ratio between the power take-off module and the transmission output shaft.

The above features and advantages and other features and advantages of the present disclosure are readily apparent from the following detailed description of the best modes for carrying out the disclosure when taken in connection with the accompanying drawings.

DETAILED DESCRIPTION

Battery electric vehicles (BEVs) utilize stored energy to provide power to an electric machine operative to provide motive force to the vehicle. Some vehicles, for example, commercial vehicles operating for a particular utilitarian purpose, operate an auxiliary device that utilizes a shaft providing an output torque to power the auxiliary device. Such an output shaft operable to provide an output torque to an auxiliary device may be described as a power take-off (PTO).

According to example illustrations herein, a torque generating device including an electric drive unit, e.g., an electric motor-generator, may be paired with a torque converter comprising a fluid coupling that is configured to selectively multiply torque of the motor-generator unit in a desired speed range of the motor-generator. In this manner, a vehicle or generator relying at least in part upon the motor-generator may employ a relatively smaller or less powerful motor-generator, relying in part upon torque multiplication characteristics of the torque converter to provide adequate torque during vehicle launch or otherwise at lower motor speeds, while reducing overall size and cost of the motor-generator. More specifically, by multiplying torque with a torque converter at lower motor speeds, a motor-generator with a lower power output (and corresponding lower size, weight, and/or cost) may be used as compared with previous approaches. Performance at higher motor speeds may also not suffer compared with larger motor-generators, as the primary limiting factor for electric motor-generators is typically low-speed torque goals, and not high-speed power output. Example electric drives may employ a torque converter having a lockup clutch to prevent slip between input and output elements, thereby allowing slip to be eliminated across the torque converter when torque multiplication is not useful, e.g., at higher motor speeds. While the addition of a torque converter may utilize different operating methodologies for a vehicle or machine such as a stationary power generator, overall drivability of example electric drive systems remains relatively smooth and, at a minimum, equal to previous approaches to electric drive units, which lack a torque converter.

Some example torque converters disclosed in connection with electric drive units herein may be coupled directly to a rotatable shaft driven by an electric motor-generator. For purposes of this disclosure, a torque converter is directly coupled to a rotatable shaft when an input of the torque converter is either directly driven such that the rotatable shaft and input to the torque converter are formed together or otherwise in direct contact and concentric. In another example of a torque converter input being directly driven by a motor-generator, the rotatable shaft is coupled to the torque converter input by way of a fixed gearing. In other example illustrations, a torque converter input is coupled to the rotatable shaft such that an input torque applied to the torque converter input is substantially equal to the motor output torque.

Figure 1:
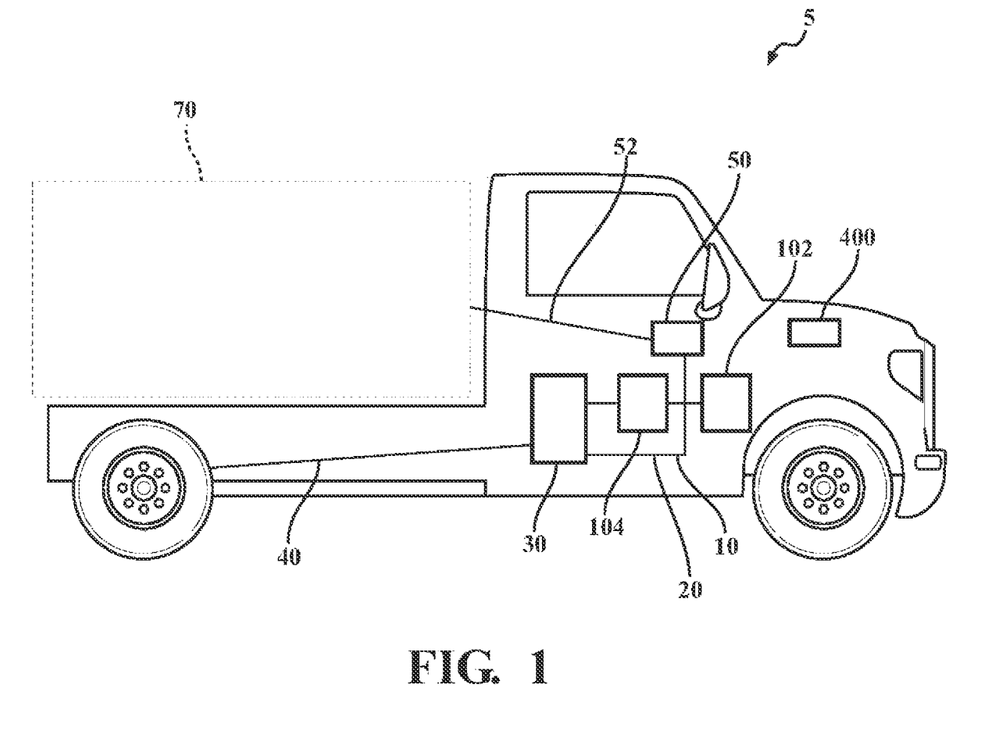
FIG. 1 schematically illustrates in side view an exemplary BEV truck including a PTO module output shaft, in accordance with the present disclosure.

Referring now to the drawings, wherein like reference numbers refer to like features throughout the several views, FIG. 1 schematically illustrates in side view an exemplary BEV truck 5 including a PTO module output shaft 52. The BEV truck 5 includes powertrain system 10 including an electrically powered torque generating device. The torque generating device of FIG. 1 includes MGU 102 that utilizes electrical energy to generate an output torque useful to provide motive force to the BEV truck 5. The MGU 102 includes an MGU output shaft which provides an MGU output torque. The powertrain system 10 further includes a torque converter 104, a torque converter bypass shaft 20, and a transmission gear set 30. The powertrain system 10 includes at least one clutch useful to cause torque to be transferred to the transmission gear set through one of the torque converter 104 and the torque converter bypass shaft 20. When the powertrain system 10 is configured to utilize the torque converter 104, the powertrain system 10 may be described to be in a torque converter mode. When the powertrain system 10 is configured to utilize the torque converter bypass shaft 20, the powertrain system 10 may be described to be in a torque converter bypass mode. The transmission gear set 30 includes a plurality of shafts and a plurality of gears and is configured to receive a transmission input torque and provide a transmission output torque to a transmission output shaft 40.

The torque converter 104 includes an impeller, a stator, and turbine. The torque converter further includes a pressurized hydraulic fluid. A torque converter input torque is transmitted to and turns the impeller. The impeller acts upon the hydraulic fluid within the torque converter 104, which in turn acts upon the turbine. The torque converter provides fluid coupling of the impeller to the turbine. The torque converter 104 improves drive quality, providing cushioned operation filtering out vibrations in a torque generating device or MGU attached to the torque converter input shaft. Additionally, the torque converter 104 provides torque multiplication at a vehicle start or at relatively low speeds.

The torque converter 104 provides excellent operating properties for the powertrain system 10 at relatively low speeds. At relatively higher speeds, the torque converter bypass shaft 20 may be utilized to avoid inefficiencies that occur operating the torque converter 104 at the relatively higher speeds. In one embodiment, a disconnect clutch may be disposed between the MGU 102 and the torque converter 104, enabling the torque converter 104 to be isolated from the MGU 102.

A PTO module 50 is illustrated connected to the powertrain system 10. The PTO module 50 receives mechanical power from the powertrain system 10 and provides a PTO output torque to the PTO module output shaft 52. The PTO module output shaft 52 is illustrated providing power to a utility unit 70 disposed upon a bed portion of the BEV truck 5. The utility unit 70 may include a device that utilizes rotational mechanical power to operate, such as but not limited to dump trucks, vacuum/street cleaning trucks, trucks utilizing a crane or welding equipment, cement mixing trucks, or other similar truck configurations. The PTO module output shaft 52 may alternatively be provided to any portion of the BEV truck 5 for a multitude of purposes.

The powertrain system 10 may be utilized in non-truck applications. For example, a BEV automobile configured as a sedan or a crossover vehicle may include a PTO module 50 for use with an accessory device such as a winch or a water pump. A boat may utilize powertrain system 10 to provide motive power to the boat and a PTO module 50 may provide power to a mechanical skimming device or a system for winding and unwinding a fishing net. A variety of applications for the use of powertrain system 10 are envisioned utilizing a primary and a selectively, independently operable secondary output torque, and the disclosure is not intended to be limited to the examples provided herein.

Figure 2:
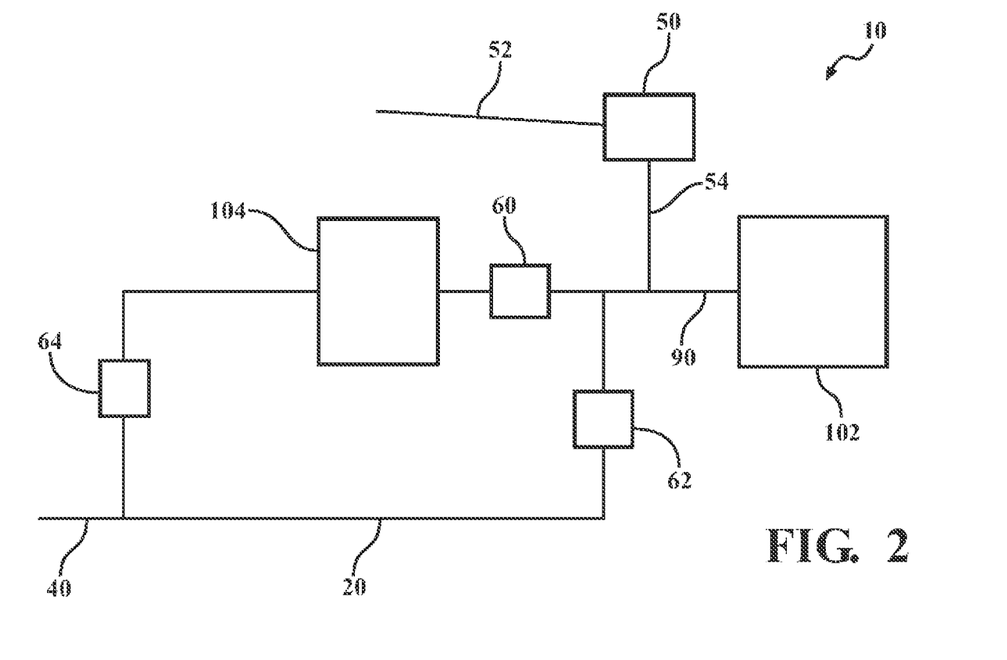
FIG. 2 schematically illustrates the powertrain system of FIG. 1, including a PTO module connected to the powertrain system at an MGU output shaft, in accordance with the present disclosure.

FIG. 2 schematically illustrates the powertrain system of FIG. 1, including a PTO module 50 connected to the powertrain system 10 at an MGU output shaft 90. The powertrain system 10 is illustrated including the MGU 102, the torque converter 104, the torque converter bypass shaft 20, the transmission output shaft 40, a disconnect clutch 60, a torque converter clutch 62, and a one-way clutch 64. The one-way clutch 64 may be a selectable one-way clutch enabling control over whether torque is permitted to or prevented from being transmitted through the one-way clutch 64. The torque converter clutch 62 may be operated to selectively transmit torque through the torque converter bypass shaft 20, bypassing torque transmission through the torque converter 104. Additionally, the disconnect clutch 60 may be disengaged to further isolate the torque converter 104 from the MGU 102. A transmission gear set 30 of FIG. 1 may or may not be utilized. Additionally, FIG. 2 illustrates the PTO module 50 connected to the MGU output shaft 90 by a mechanical connection 54. The mechanical connection 54 may include a device or configuration enabling mechanical power to be provided to the PTO module 50 through the mechanical connection, and may include interlocking gears, a chain drive, a belt drive, a turning shaft, or other similar devices. The PTO module 50 is illustrated connected to the PTO module output shaft 52. The PTO module 50 may be operated simultaneously with mechanical power being provided to the transmission output shaft 40. Alternatively, operating the disconnect clutch 60 and the torque converter clutch 62 in a disengaged state enables providing mechanical power to the PTO module 50 independently of power being provided to the transmission output shaft 40. A BEV truck 5 of FIG. 1 utilizing the powertrain system 10 may be moving down a street under power from the powertrain system 10 while delivering mechanical power to the PTO module 50, such as a street cleaning truck cleaning the street while moving, or the BEV truck 5 may be stationary or in a park transmission setting while the powertrain system 10 is delivering mechanical power to the PTO module 50, such as a tree-trimming truck operating a wood chipper. By connecting the PTO module 50 to the MGU output shaft 90, other components to the system, such as the torque converter 104, may be deactivated and remain stationary, thereby utilizing the system as energy efficiently as possible.

Figure 3:
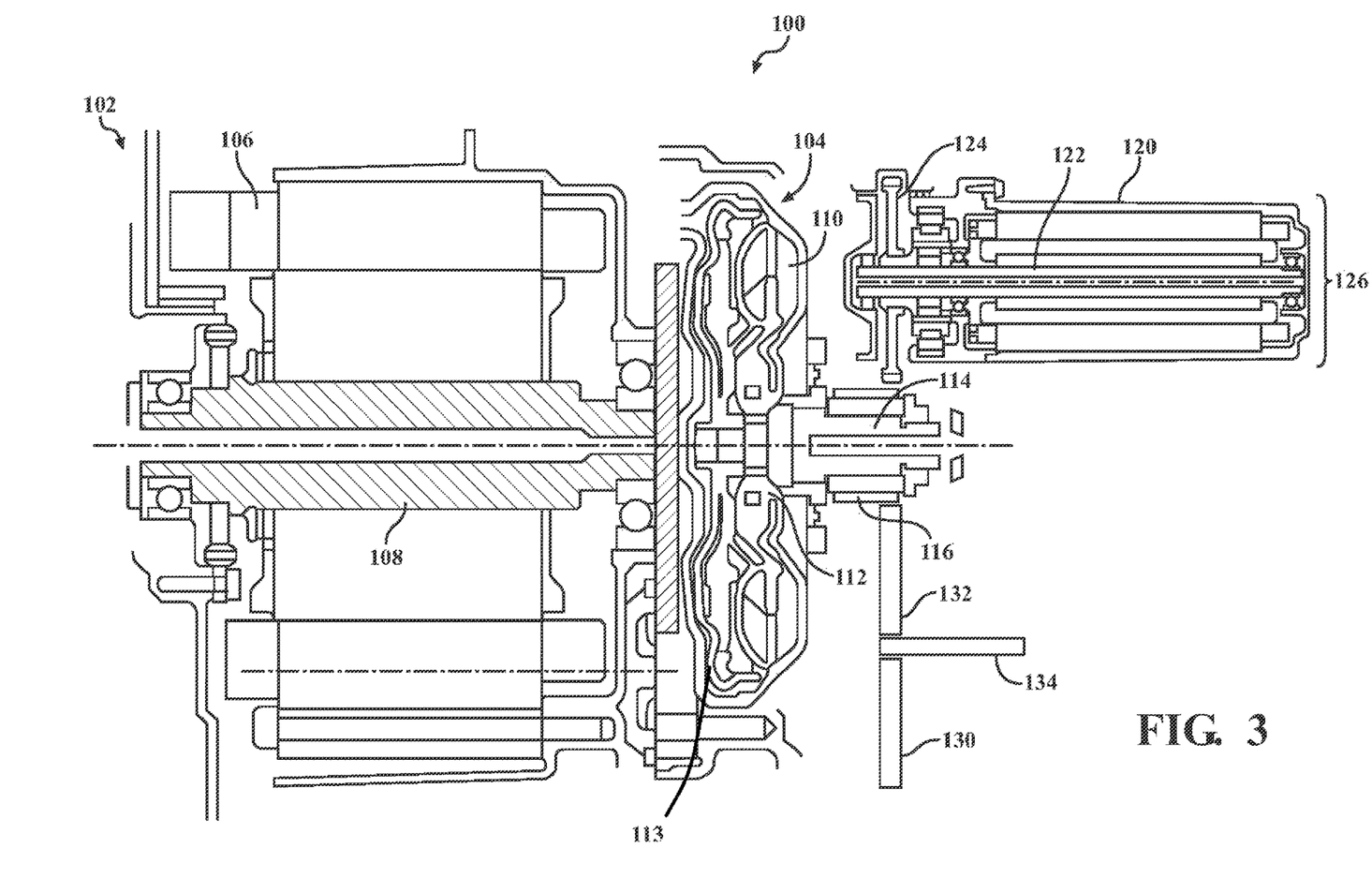
FIG. 3 is a partial section view of a torque converter for an electrical drive for use in a vehicle or machine, in accordance with the present disclosure.

FIG. 3 is a partial section view of a torque converter for an electrical drive for use in a vehicle or machine. FIG. 3 illustrates an example electric drive unit 100 which may include the MGU 102 that is coupled with the torque converter 104. The MGU 102 may include a rotor 106 fixed for rotation about rotatable shaft 108. Accordingly, the MGU 102 may selectively drive the rotatable shaft 108 or generate electrical power from rotation of the shaft 108, e.g., during coasting of a vehicle associated with the electric drive unit 100.

The rotatable shaft 108 may be fixed at an end opposite the MGU 102 to a torque converter 104, such that rotation of the shaft 108 turns an input of the torque converter 104. For example, as illustrated in FIG. 3, the torque converter input may be a pump 110 which drives a turbine 112 via a fluid coupling. The pump/input 110 of the torque converter 104 is separated from the turbine/output 112 of the torque converter by a fluid coupling. The torque converter may have additional components not described in detail herein, but which are utilized in the art, that are configured to facilitate flow of fluid within the torque converter 104 to manage the fluid coupling between the input 110 and output 112. Merely as examples, the torque converter 104 may have a stator or other features formed within the torque converter 104 for selectively coupling the input 110 and output 112 for rotation together via the fluid coupling. The torque converter 104 may include a clutch 113 or other means for selectively locking the input 110 and output 112 together for rotation together without slip. For example, when the torque converter 104 reaches a threshold rotational speed of the input 110 and output 112, the clutch 113 may be actuated to synchronize rotational speeds of the input 110 and output 112, and/or generally eliminate slip between the input 110 and output 112.

The torque converter 104 may selectively multiply torque output via the fluid coupling between the input 110 and output 112. An input torque applied to the input 110 may be substantially equal to a motor output torque of the MGU 102 transmitted by rotation of the shaft 108 to the input 110. The fluid coupling between the input 110 and output 112, particularly at relatively low rotational speeds of the MGU 102, may multiply torque received at the input 110 such that a drive unit output torque of the output 112 is increased. This multiplication of torque across the torque converter, i.e., from the input 110 to the output 112, may be particularly useful in low speed ranges, such as when using the torque converter 104 to launch a vehicle from a stop. Accordingly, this torque multiplication in at least a predetermined rotational speed range of the MGU 102 may allow the usage of a relatively smaller MGU 102, as compared with previous approaches where a motor-generator drives an output directly, i.e., without the benefit of a torque converter.

The drive unit 100 may provide rotational output in any manner that is convenient. As illustrated in FIG. 3, the torque converter 104 may have an output shaft 114 driven by the output 112 of the torque converter 104. In one example, the output shaft 114 is fixed for rotation with the output 112. The output shaft 114 may in turn drive a vehicle drivetrain, final drive unit, or the like, e.g., by way of a gear 116 at an end of the shaft 114.

Figure 4:
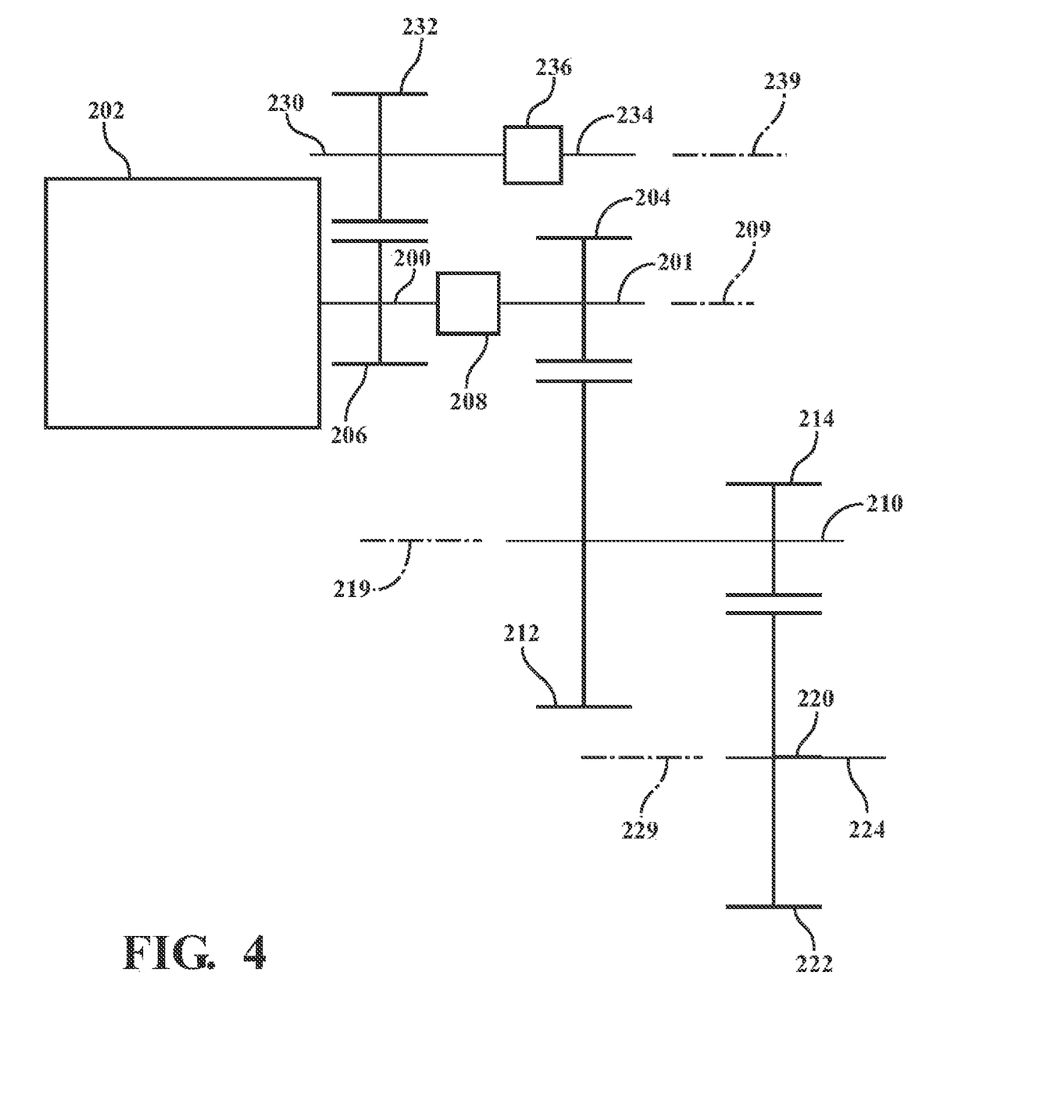
FIG. 4 schematically illustrates an alternative powertrain system, including a PTO module interacting with the powertrain system including a single speed gear reduction portion, in accordance with the present disclosure.

FIG. 4 further illustrates a drive shaft assembly 130 including a drive shaft 134 and a drive shaft gear 132 connected to the output shaft 114 through the gear 116 and or connected to a rotatable outer housing or torque converter shell. By turning the output shaft 114, a primary output torque may be provided to a function or device, such as drive wheels of a vehicle or a propeller of a boat. Additionally, a PTO module 120 is illustrated including a PTO input gear 124, a PTO module shaft 122, and a PTO module output 126. By turning the output shaft 114 and/or a torque converter shell, a secondary output torque may be provided by the PTO module 120 for use as described herein.

FIG. 4 schematically illustrates an alternative powertrain system, including a PTO module interacting with the powertrain system including a single speed gear reduction portion. The PTO module is defined to include a PTO input gear 232, a PTO module shaft 230, a PTO module clutch 236, and a PTO module output shaft 234. The PTO module shaft 230 and the PTO module output shaft 234 spin about a rotational axis 239. A torque generating device 202 is illustrated including a torque generating device output shaft 200 connected to a PTO drive gear 206 and a disconnect clutch 208. The single speed gear reduction portion is defined to include a first drive gear 204, a first reduction gear 212, a second drive gear 214, and a second reduction gear 222. A first drive shaft 201 is illustrated connected to the disconnect clutch 208 and includes the first drive gear 204. The torque generating device output shaft 200 and the first drive shaft 201 spin about a rotational axis 209. The first reduction gear 212 and the second drive gear 214 are connected to a second drive shaft 210 which spins about a rotation axis 219. The second reduction gear 222 is connected to a third drive shaft 220 which provides mechanical power to a transmission output shaft 224. The third drive shaft 220 and the transmission output shaft 224 spin about a rotational axis 229.

The PTO drive gear 206 provides mechanical power to the PTO module shaft 230 through the PTO input gear 232 whenever the torque generating device 202 spins the torque generating device output shaft 200. The PTO module output shaft 234 may selectively be activated or deactivated by engaging or disengaging, respectively, the PTO module clutch 236.

Figure 5:
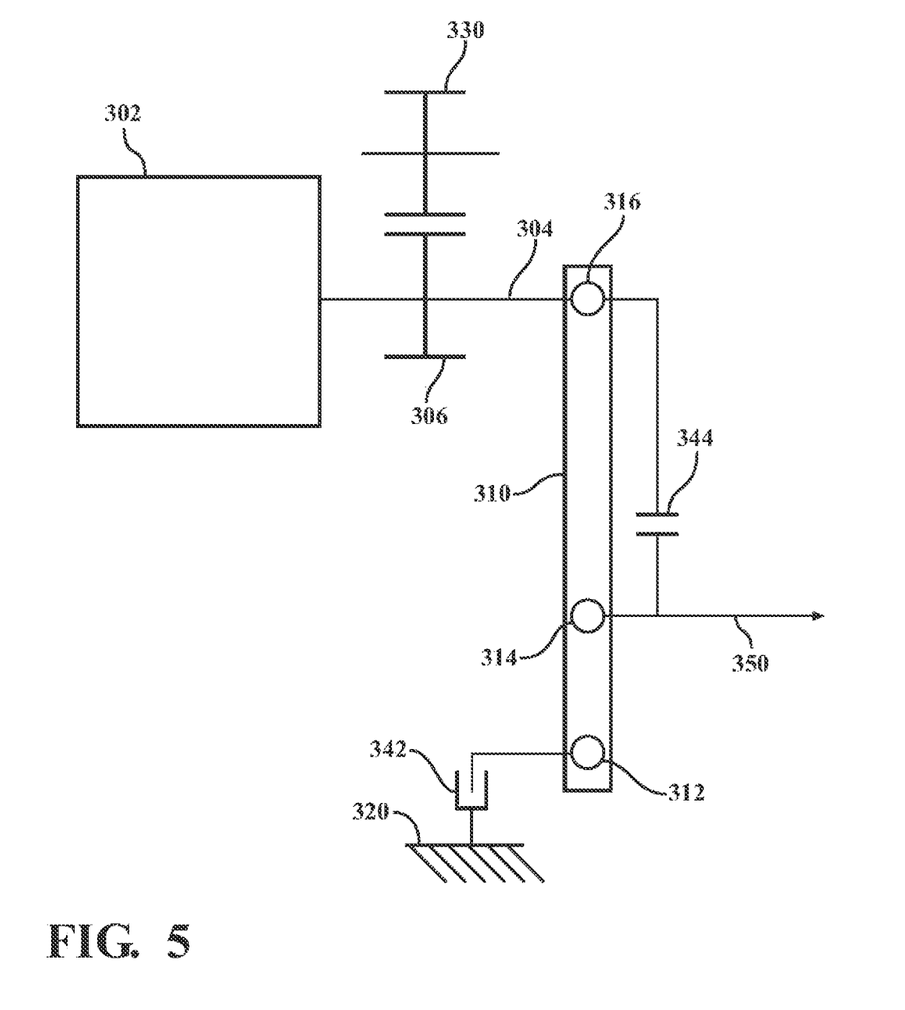
FIG. 5 schematically illustrates an alternative powertrain system, including a PTO module interacting with the powertrain system including a multi-gear planetary gear set, in accordance with the present disclosure.

FIG. 5 schematically illustrates an alternative powertrain system, including a PTO module 330 interacting with the powertrain system including a multi-gear planetary gear set 310. The PTO module 330 is defined to include a PTO input gear and a PTO module shaft, which are useful to provide a PTO output torque. A torque generating device 302 is illustrated providing a torque generating device output torque to a torque generating device output shaft 304. A PTO drive gear 306 is illustrated connected to the torque generating device output shaft 304.

The planetary gear set 310 is illustrated including a sun gear 312, a ring gear 316, and pinion gear 314. A first planetary gear clutch 342 is illustrated selectively locking the sun gear 312 to a stationary ground fixture 320. A transmission output shaft 350 is illustrated connected to the pinion gear 314. A second planetary gear clutch 344 is illustrated selectively locking the ring gear 316 to the transmission output shaft 350. A gear ratio of the PTO module 330 and the torque generating device output shaft 304 may be fixed. By selective engagement of the first planetary gear clutch 342 and the second planetary gear clutch 344, different gear ratios of the torque generating device output shaft 304 to the transmission output shaft 350 may be achieved. The powertrain system of FIG. 5 enables the PTO module 330 to be operated simultaneously with output torque being delivered to a transmission output shaft 350, with different gear ratios being selectable between the two. Disengagement of the first planetary gear clutch 342 and the second planetary gear clutch 344 disconnects the transmission output shaft 350 from the torque generating device output shaft 304.

Figure 6:
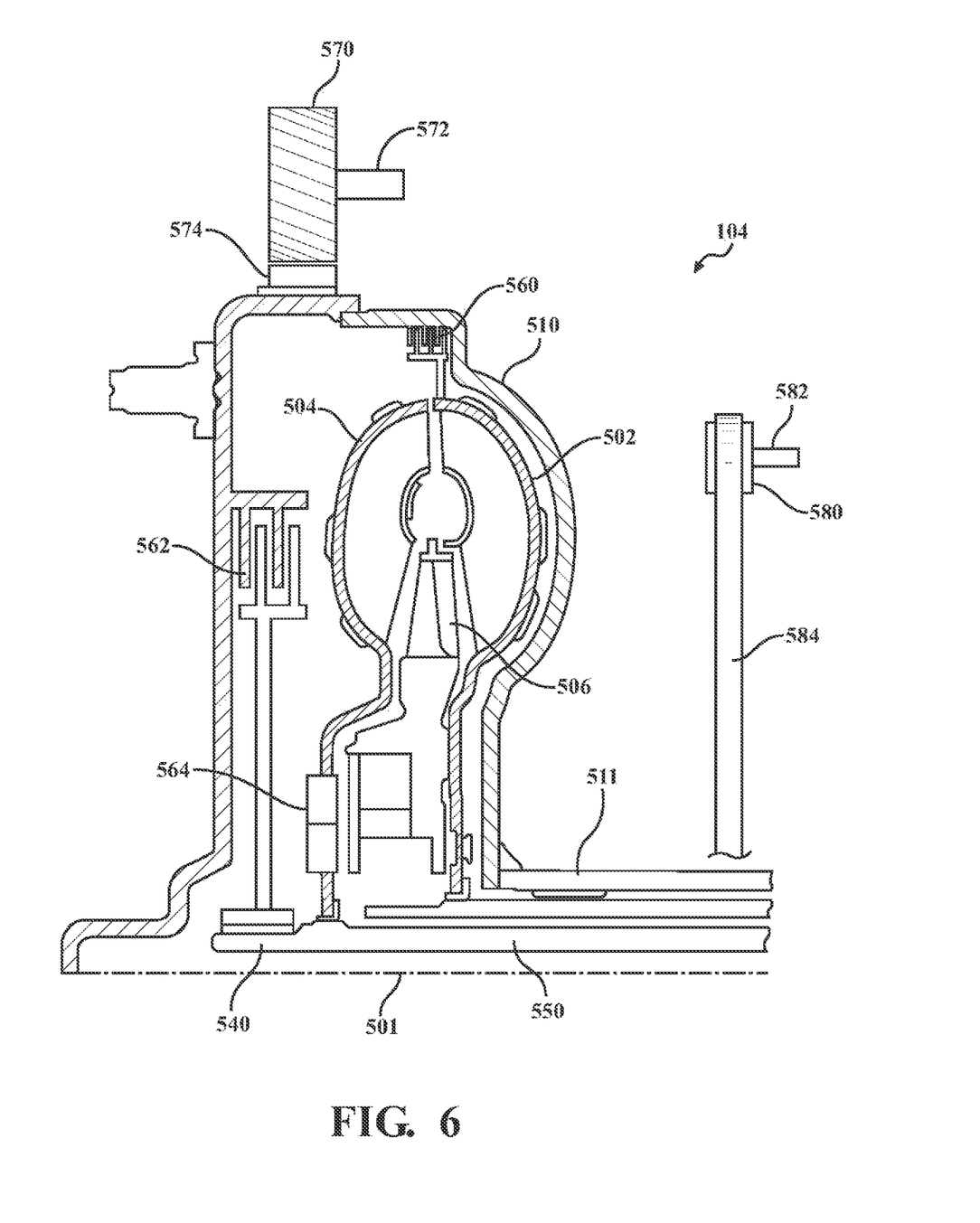
FIG. 6 schematically illustrates an exemplary torque converter including an integrated disconnect clutch and a first PTO module connected to a rotatable outer housing of the torque converter and a second PTO module connected by a chain drive to a torque converter output shaft, in accordance with the present disclosure.

A number of different torque converter configurations may be utilized with the disclosed system and method. FIG. 6 schematically illustrates in cross-section view an exemplary torque converter 104 including an integrated disconnect clutch 560 and a first PTO module connected to a rotatable outer housing 510 of the torque converter 104 and a second PTO module connected by a chain drive 584 to a rotatable outer housing portion 511 connected to and spinning with the rotatable outer housing 510. The rotatable outer housing 510 and the rotatable outer housing portion 511 may collectively be described as a torque converter shell operable to rotate. A top half of the torque converter 104 is illustrated including a torque converter rotational axis 501. A bottom half of the torque converter 104 may be substantially similar or identical to the illustrated top half. The torque converter 104 includes an impeller 502, a turbine 504, and a stator 506. The impeller 502 and the turbine 504 are configured to spin about the torque converter rotational axis 501. An MGU output shaft is connected to and provides a torque to a rotatable outer housing 510. The rotatable outer housing 510 is configured to spin about the torque converter rotational axis 501 and may spin in unison with the MGU output shaft. The rotatable outer housing 510 is connected to a disconnect clutch 560. The disconnect clutch 560 provides selectable connection between the rotatable outer housing and the impeller 502. Engagement of the disconnect clutch 560 causes the impeller 502 to spin in unison with the rotatable outer housing 510. The torque converter 104, when active, is filled with pressurized hydraulic fluid. The spinning of the impeller 502 acts upon the pressurized hydraulic fluid, which acts upon the turbine 504 and the stator 506, causing the turbine 504 to turn. The turbine 504 is connected to a selectable one-way clutch 564 which selectively permits or prevents torque being transmitted between the turbine 504 and a transmission output shaft 550. The transmission output shaft 550 is illustrated as a hollow tube that spins about the torque converter rotational axis 501. When engaged, the disconnect clutch 560 enables use of the torque converter 104 in a torque converter mode as described herein.

A torque converter clutch 562 is illustrated, selectively connecting the rotatable outer housing 510 to a torque converter bypass shaft 540. In the embodiment of FIG. 6, the torque converter bypass shaft 540 is a portion of or is attached to the transmission output shaft 550. By engaging the torque converter clutch 562, the torque converter bypass shaft 540 and the attached transmission output shaft 550 are caused to spin with the rotatable outer housing 510.

Selective engagement and disengagement of the disconnect clutch 560 and the torque converter clutch 562 enables operation of a torque converter mode, wherein torque is transmitted through impeller 502 and the turbine 504 of the torque converter 104, and operation of the torque converter bypass mode, wherein the impeller 502 and the turbine 504 may be isolated from the rotatable outer housing 510 connected to the MGU output shaft and transmission of torque between the rotatable outer housing 510 and the transmission output shaft 550 through the torque converter bypass shaft 540.

A first PTO module is illustrated and includes a PTO input gear 570 connected to a PTO shaft 572. The rotatable outer housing 510 may include a ring-shaped PTO drive gear 574 about an outer circumference of the rotatable outer housing 510, such that when the rotatable outer housing 510 spins with the MGU output shaft, mechanical power is provided to the PTO input gear 570. A second PTO module is illustrated including a PTO input pulley 580 connected to a PTO shaft 582. The drive chain 584 is illustrated connected to the PTO input pulley 580 and to the rotatable outer housing portion 511. Mechanical power is applied to the drive chain 584 through the rotatable outer housing portion 511, which provides mechanical power to the second PTO module. The powertrain system of FIG. 6 may include the first PTO module, the second PTO module, or the first PTO module and the second PTO module.

Figure 7:
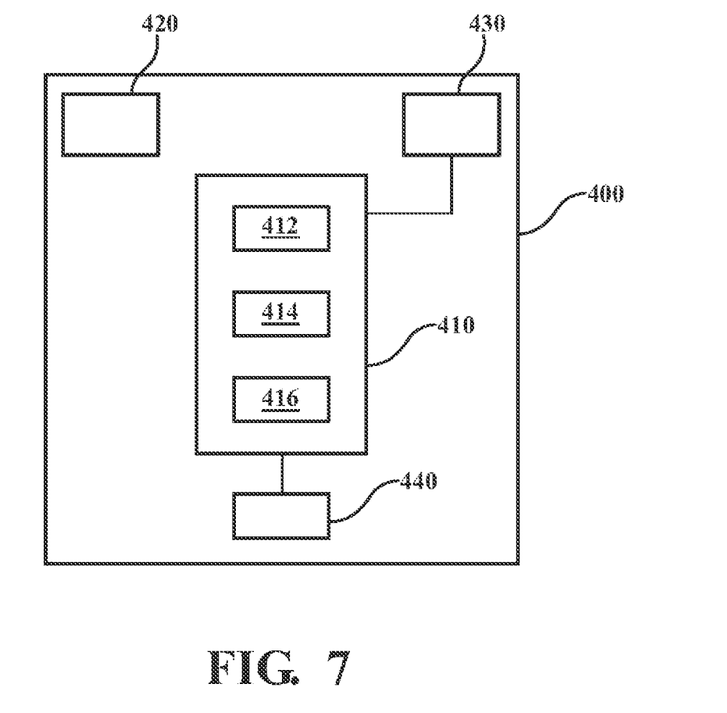
FIG. 7 schematically illustrates the computerized PTO controller of FIG. 1, in accordance with the present disclosure.

FIG. 7 schematically illustrates the computerized PTO controller 400 of FIG. 1. The computerized PTO controller 400 includes a computerized processing device 410, a cellular communications module 420, a user input/output device 430, and a memory storage device 440. It is noted that the computerized PTO controller 400 may include other components and some of the components are not present in some embodiments.

The processing device 410 may include memory, e.g., read only memory (ROM) and random-access memory (RAM), storing processor-executable instructions and one or more processors that execute the processor-executable instructions. In embodiments where the processing device 410 includes two or more processors, the processors may operate in a parallel or distributed manner. The processing device 410 may execute the operating system of the computerized PTO controller 400. Processing device 410 may include one or more modules executing programmed code or computerized processes or methods including executable steps. Illustrated modules may include a single physical device or functionality spanning multiple physical devices. In the illustrative embodiment, the processing device 410 also includes a PTO status module 412, a clutch control module 414, and a PTO operation module 416, which are described in greater detail below.

The cellular communications module 420 may include a communications/data connection with a bus device configured to transfer data to different components of the system and may include one or more wireless transceivers for performing wireless communication.

The user input/output device 430 includes hardware and/or software configured to enable the processing device 410 to provide information to and receive inputs from a user, for example, a driver of a vehicle.

The memory storage device 440 is a device that stores data generated or received by the processing device 410. The memory storage device 440 may include, but is not limited to, a hard disc drive, an optical disc drive, and/or a flash memory drive.

The PTO status module 412 may include programming operable to monitor, estimate, and/or predict operation various components of the powertrain system and may include a determination whether the PTO module output shaft is to be activated. For example, when a PTO disconnect clutch is present in the PTO module, the PTO status module 412 may monitor a PTO activation button available to a user of the vehicle, and the PTO disconnect clutch may be engaged or disengaged based upon the setting. Similarly, if a PTO activation button indicates that the PTO is to be engaged, and the system is configured to operate when the vehicle is parked, the PTO status module 412 may monitor a transmission setting of the vehicle and generate a warning to a user of the vehicle if the transmission setting is not in park.

The clutch control module 414 may include programming operable to control operating clutches used by the disclosed powertrain system. The clutch control module 414 may include programming useful to maintain a clutch in an engaged state, maintain a clutch in a disengaged state, and transition a clutch between states. The clutch control module 414 may further include programming to control operation of an SOWC, controlling whether the SOWC permits or prevents torque transmission through the SOWC.

The PTO operation module 416 may include programming operable to control operation of the MGU 102 of FIG. 1, for example, managing an MGU speed based upon indicated operation of the PTO module and programmed limits for operation of the PTO. For example, when the PTO is disengaged or not in use, the vehicle may include relatively wide limits on operation of the MGU based upon specifications and limitations of the MGU. When the PTO is engaged, the equipment or accessory attached to the PTO may include a maximum rotational speed less than the maximum rotational speed of the MGU. The PTO operation module 416 may limit the operation of the MGU while the PTO is engaged based upon the limitations of the accessory attached to the PTO module output shaft. In another example, the PTO operation module 416 may monitor an available battery charge of the vehicle and limit operation of the PTO module based upon conserving some portion of a maximum battery charge to ensure the vehicle may return to a home base.

The computerized PTO controller 400 is provided as an exemplary computerized device capable of executing programmed code to operate the disclosed powertrain system and associated processes. A number of different embodiments of the computerized PTO controller 400 and modules operable therein are envisioned, and the disclosure is not intended to be limited to examples provided herein.

While the best modes for carrying out the disclosure have been described in detail, those familiar with the art to which this disclosure relates will recognize various alternative designs and embodiments for practicing the disclosure within the scope of the appended claims.

What is claimed is:

1. A system for a power take-off mechanism for a powertrain system, comprising:
    an electrically powered torque generating device including a torque generating device output shaft;
    a transmission output shaft receiving mechanical power from the torque generating device output shaft;
    a clutch selectively disengaging the transmission output shaft from the torque generating device output shaft;
    a torque converter disposed between the torque generating device output shaft and the transmission output shaft and operable to transmit torque from the torque generating device output shaft and the transmission output shaft, wherein the torque converter includes a torque converter output shaft;
    a torque converter bypass shaft;
    a torque converter clutch selectively connecting the torque converter bypass shaft to the torque generating device output shaft; and
    a power take-off module receiving mechanical power from the torque generating device; and
    wherein the system is configured for selective operation in a first mode, wherein torque is transmitted between the electrically powered torque generating device and the transmission output shaft through the torque converter, in a second mode, wherein torque is transmitted between the electrically powered torque generating device and the transmission output shaft through the torque converter bypass shaft, and in a third mode, wherein torque is transmitted between the electrically powered torque generating device and the power take-off module.

2. The system of claim 1, further comprising an input gear, wherein the power take-off module is connected to the torque generating device output shaft via the input gear.

3. The system of claim 1, further comprising a chain drive, wherein the power take-off module is connected to the torque generating device output shaft via the chain drive.

4. The system of claim 1, further comprising a disconnect clutch disposed between the torque generating device output shaft and the torque converter and operable to selectively disconnect the torque converter from the torque generating device output shaft.

5. The system of claim 4, wherein the power take-off module is connected to the torque generating device output shaft between the torque generating device and the disconnect clutch.

6. The system of claim 1, wherein the torque converter includes:
    a rotatable outer housing configured to rotate about a rotating axis of the torque converter;
    an impeller configured to rotate about the rotating axis;
    a turbine configured to rotate about the rotating axis; and
    a one-way clutch permitting torque transmission between the turbine and the transmission output shaft; and
    wherein the power take-off module is connected to and receives mechanical power from the rotatable outer housing.

7. The system of claim 6, wherein the power take-off module includes a first power take-off module; and
    further comprising a second power take-off module.

8. The system of claim 1, wherein the power take-off module includes a power take-off clutch operable to enable selective disengagement of a power take-off shaft from the torque generating device.

9. The system of claim 1, further comprising a single speed gear reduction portion connected to the torque generating device output shaft.

10. The system of claim 1, further comprising a gear set connected to the torque generating device output shaft and providing a multiple speed gear ratio between the torque generating device output shaft and the transmission output shaft.

11. The system of claim 10, wherein the power take-off module includes a fixed gear ratio to the torque generating device output shaft; and
    wherein the gear set provides a multiple speed gear ratio between the power take-off module and the transmission output shaft.

12. A system for a power take-off mechanism for a powertrain system, comprising:
    an electrically powered torque generating device including a torque generating device output shaft;
    a transmission output shaft receiving mechanical power from the torque generating device output shaft;
    a clutch selectively disengaging the transmission output shaft from the torque generating device output shaft;
    a torque converter disposed between the torque generating device output shaft and the transmission output shaft and operable to transmit torque from the torque generating device output shaft and the transmission output shaft, wherein the torque converter includes:
        a rotatable outer housing configured to rotate about a rotating axis of the torque converter;
        an impeller configured to rotate about the rotating axis;
        a turbine configured to rotate about the rotating axis; and
        a selectable one-way clutch selectively permitting torque transmission between the turbine and the transmission output shaft;
    a torque converter bypass shaft;
    a torque converter clutch selectively connecting the torque converter bypass shaft to the torque generating device output shaft; and
    a power take-off module connected to and receiving mechanical power from the rotatable outer housing; and
    wherein the system is configured for selective operation in a first mode, wherein torque is transmitted between the electrically powered torque generating device and the transmission output shaft through the torque converter, in a second mode, wherein torque is transmitted between the electrically powered torque generating device and the transmission output shaft through the torque converter bypass shaft, and in a third mode, wherein torque is transmitted between the electrically powered torque generating device and the power take-off module.

13. The system of claim 12, wherein the power take-off module includes a first power take-off module; and
    further including a second power take-off module receiving mechanical power from the torque generating device.

14. The system of claim 12, further comprising an input gear, wherein the power take-off module is connected to the rotatable outer housing via the input gear.

15. The system of claim 12, further comprising a chain drive, wherein the power take-off module is connected to the rotatable outer housing via the chain drive.

* * * * *